United States Patent [19]

Ohtsuka et al.

[11] Patent Number: 4,669,849
[45] Date of Patent: Jun. 2, 1987

[54] CAMERA

[75] Inventors: Masanori Ohtsuka, Kanagawa; Hideo Taka, Tokyo, both of Japan

[73] Assignee: Canon Kabushiki Kaisha, Japan

[21] Appl. No.: 802,761

[22] Filed: Nov. 27, 1985

[30] Foreign Application Priority Data

Nov. 30, 1984 [JP] Japan .................................. 59-253316
Nov. 30, 1984 [JP] Japan .................................. 59-253317

[51] Int. Cl.⁴ .............................................. G03B 3/00
[52] U.S. Cl. .................................................. 354/400
[58] Field of Search ................ 354/400, 401, 402, 403

[56] References Cited

U.S. PATENT DOCUMENTS

4,550,994 11/1985 Maruyama .......................... 354/402

Primary Examiner—Michael L. Gellner
Attorney, Agent, or Firm—Toren, McGeady and Goldberg

[57] ABSTRACT

A camera having an automatic focus detecting device arranged to form a focusing data required for adjusting a phototaking optical system into an in-focus state is provided with switch means for allowing the automatic focus detecting device to operate; and a storing device arranged to store and retain the focusing data over a predetermined period of time even with the switch means turned off either before or after an exposure.

8 Claims, 12 Drawing Figures

CAMERA

BACKGROUND OF THE INVENTION

1. Field of the Invention

This invention relates to an improvement on a camera of the kind having automatic focus detecting device arranged to form a measured distance data required for adjusting a photo-taking optical system into an in-focus state and a focusing data indicative of a de-focused state, etc.

2. Description of the Prior Art

Cameras of the kind having an automatic focus detecting device which forms a focusing data for adjustment of a photo-taking optical system to an in-focus state are generally arranged to obviate the necessity of performing a manual focusing operation and to accomplish a photo-taking operation when a shutter button is just pushed with the image of an object to be photographed set within a distance measurement mark provided at a middle part of a view finder.

However, it has been a shortcoming of the camera of this kind that an in-focus picture of a desired object cannot be taken unless the object is within the distance measurement mark of the view finder when the shutter button is pushed. This shortcoming has deprived the photographers of having a wide picture composing latitude when they wish, for example, to have a main object placed at a corner of a picture. The same shortcoming has presented another problem that, in the event of a continuous photographing operation, the object might move out of the distance measurement mark of the view finder and come out of focus.

To eliminate this shortcoming of the camera having an automatic focus detecting device, there has been proposed a camera having a so-called pre-focus device which is characterized by the arrangement that detection of a focusing data and retention thereof can be accomplished by just pushing the shutter button halfway downward. In this case, the camera is operated as follows: The object as viewed from a view finder is placed inside the distance measurement mark and the shutter button is pushed halfway to obtain a focusing data. Then, while leaving the shutter button in the half pushed state, a picture is composed as desired. After a picture composition is thus determined, the shutter button is further pushed. In this manner, the object can be photographed always in a sharply focused state wherever the object is located within the view finder. In this case, however, for retaining the same focusing data, the shutter button is left in the half pushed state which is very unstable. Therefore, while the camera is shifted in composing a picture, the shutter button might be released from the halfway operation and thus might unintentionally be brought back to its original position. Besides, the switch of a circuit for holding the focusing data might come to chatter if the force of a finger pushing it is momentarily lost under a vibrant condition, etc. in further pushing the shutter button for photographing. Then, the chattering of the switch lets the retained data disapper before use. Further, while the shutter button is thus kept in the half pushed state, the photographer might by mistake let the shutter button come back to its original position before pushing it to a full stroke. These misoperations are sometimes unconsciously performed to find a blurred photograph later on. Even if the photographer comes to note such a mis-operation before photographing, he or she would miss a valuable shutter chance while attempting to obtain a focusing data once again.

In another known example of improvement which has been disclosed, for example, in Japanese Laid-Open Patent application No. SHO 56-1024, the focusing data is arranged to be retained by means of a switch arranged to be operated independently of the shutter button. This improvement, however, has presented the following problems: An oversight or negligence to turn off the above-stated switch would waste electric energy. This problem is a very serious for cameras which are allowed to use batteries of a limited capacity. Further, if a next photographing operation is performed with the switch having been not turned off by an oversight after a photographing operation, the new photgraphing operation would be performed on the basis of the focusing data previously obtained.

SUMMARY OF THE INVENTION

A first object of this invention is to provide an improvement on a camera having an automatic focus detecting device. The improvement comprises an automatic focus detecting device for forming a focusing data required for adjusting a phototaking optical system into an in-focus state; switch means for allowing the automatic focus detecting device to operate; and a storing device arranged to store and hold the focusing data over a predetermined period of time even with the switch means turned off before commencement of an exposure. The improvement eliminates the above-stated shortcomings of the cameras of the prior art and is capable of enabling the photographer to freely determine a picture composition while retaining the in-focus state obtained by the automatic focus detecting device without wasting electric energy, without incurring any erroneous operation thereon and without degrading the operability of the camera.

A second object of this invention is to provide a camera comprising an automatic focus detecting device arranged to form a focusing data required for adjusting a photo-taking optical system into an in-focus state; switch means for allowing the focus detecting device to operate; and a storing device arranged to store and hold the focusing data over a predetermined period of time after completion of an exposure even after the switch is turned off. In the camera, the focusing data obtained by the automatic focus detecting device can be retained without wasting electric energy, without incurring any erroneous operation thereon and without degrading the operability of the camera even in cases where a main object to be photographed moves within a picture plane during a continuous photographing operation.

These and further objects and features of this invention will become apparent from the following detailed description of embodiments thereof taken in connection with the accompanying drawings.

DETAILED DESCRIPTION OF THE PREFERRED EMBODIMENTS

Figure 1:
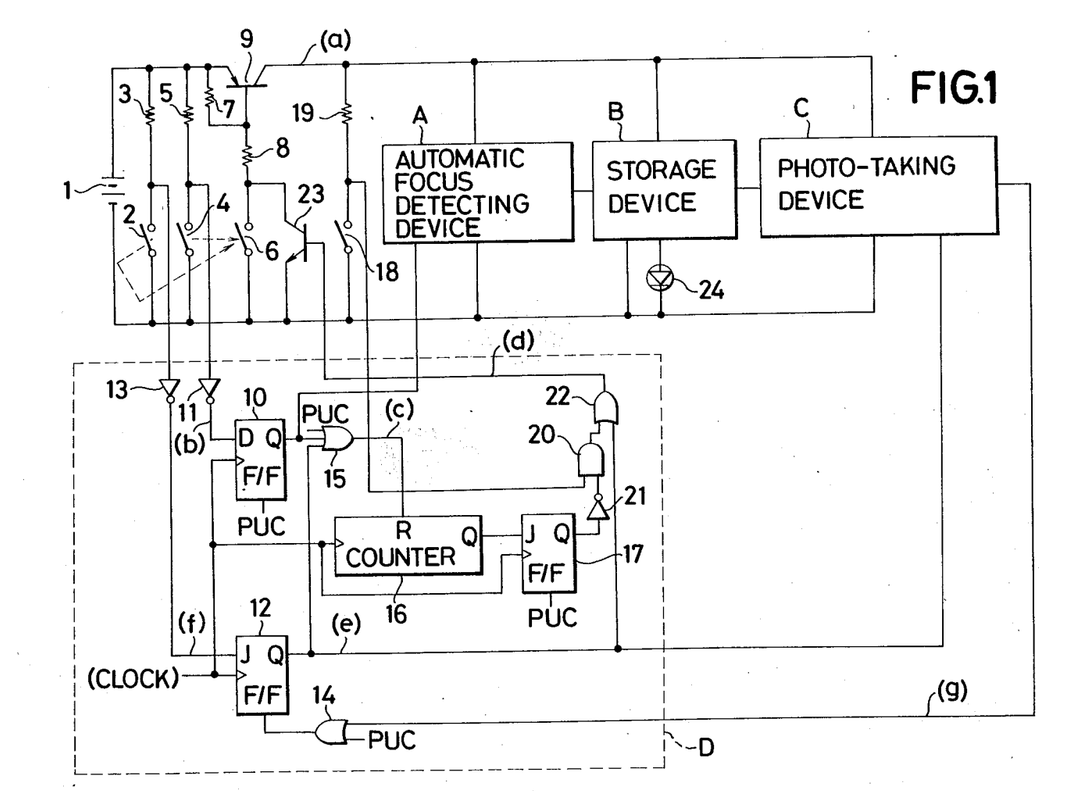
FIG. 1 is a circuit diagram showing the circuit arrangement of a camera which embodies this invention as an embodiment thereof.

Referring to the accompanying drawings, an embodiment of this invention is arranged as follows: FIG. 1 shows in a block diagram the circuit arrangement of a camera arranged according to this invention. The camera is provided with an automatic focus detecting device A which is arranged in a known manner to detect, when a power supply is switched on, a distance measurement data required for bringing a photo-taking lens into an in-focus state relative to an object to be photographed and a defocus data or the like required for focus adjustment. The details of the arrangement of this device A will be further described later herein. The camera is provided further with a storage device B which is arranged to store and retain a focusing data obtained from the automatic focus detecting device A as long as the power supply switch is on. The details of this storage device will be described also later herein. Also included in the illustration is a photo-taking device C which is arranged to receive a shutter release signal; to shift a photo-taking lens which is not shown to an in-focus position according to the focusing data retained by the storage device B upon receipt of the shutter release signal; and then to initiate an exposure effecting operation. Upon completion of an exposure, a known film winding device which is not shown performs film winding to wind up one frame portion of film. The embodiment further includes a power supply holding circuit D. The circuit D is arranged to continuously effect power supply to the automatic focus detecting device A, the storage device B and the photo-taking device C for a predetermined period of time after a pre-focus operation member or a shutter release operation member which is not shown but is arranged to be operated from the outside of the camera is released from an operated state.

The circuit arrangement of FIG. 1 further includes a battery 1 which is employed as a power source; a release switch 2 which is connected via a pull-up resistor 3 to the battery 1 and is arranged to be closed by the operation of a shutter release operation member (not shown) which is arranged to be operated on the outside of the camera; a prefocus switch 4 which is connected via a pull-up resistor 5 to the battery 1 and is arranged to detect only a focusing data without participating in the photo-taking operation and to be closed by the operation of a pre-focus operation part which is not shown but is arranged to be operated on the outside of the camera; and a power supply switch 6. The switch 6 is arranged to be closed in response to closing of the release switch 2 or that of the pre-focus switch 4 and is connected to the battery 1 via resistors 7 and 8. When the power supply switch 6 is closed, a power supply is effected from the battery 1 via a power supply transistor 9 to the automatic focus detecting device A, the storage device B and the photo-taking device C. A D type flip-flop 10 is arranged to hold, in synchronism with a clock signal, a high level signal which comes to its D input terminal via an inverter 11 when the pre-focus switch 4 is closed. A J type flip-flop 12 is arranged to hold, in synchronism with the clock signal, a high level signal coming to its J input terminal via an inverter 13 when the release switch 2 is closed. The J type flip-flop 12 is also arranged to supply the photo-taking device C with a photographing operation start signal. An OR gate 14 is arranged to reset the J type flip-flop 12 upon receipt of an initial setting signal PUC which is produced from an initial setting circuit (not shown) in response to a oneframe winding completion signal produced from the photo-taking device C or in response to closing of the power supply switch 6. An OR gate 15 is arranged to receive the Q output of the D type flip-flop 10, that of the J type flip-flop 12 and the above-stated initial setting signal PUC. A counter 16 is arranged to produce from its Q output terminal a high level signal for a predetermined period of time after it is released from a reset state. The counter 16 is reset by the high level signal produced from the OR gate 15 after closing of the release switch 2 at which the level of the Q output of the J type flip-flop 12 becomes high, or during a period after the end of a photographing operation until the one-frame winding signal is produced, or when the pre-focus switch 4 is closed at which time the level of the Q output of the D type flip-flop 10 becomes high, or when the initial setting signal PUC is produced. A J type flip-flop 17 is arranged to be reset by the initial setting signal PUC, to hold the Q output of the counter 16 when the level of the Q output becomes high to indicate thereby that the counter 16 has counted the above-stated predetermined time. A selection switch 18 is connected to the battery 1 via a pull-up resister 19 and a transistor 9. The switch 18 is arranged to determine whether the power supply from the battery 1 is to be continued for a predetermined period of time or not to the automatic focus detecting device A, the storage device B and the photo-taking device C after the release of the power supply switch 6 from its operated state when an operation on the shutter release operation member or pre-focus operation member which is not shown comes to a stop, or after completion of winding of a oneframe portion of film. An AND gate 20 is arranged to produce a high level signal coming from an inverter 21 only when the selection switch 18 is open. This high level signal is produced until the J type flip-flop 17 comes to produce a high level signal from its Q output terminal with the abovestated predetermined time having been counted by the counter 16. An OR gate 22 is arranged to receive the output of the AND gate 20 and the Q output of the J type flip-flop 12. The OR gate 22 produces a high level signal until the J type flip-flop 17 comes to produce a high level signal from its Q output terminal when the selection switch 18 is open or until the operation of the photo-taking device C comes to an end irrespective as to whether the selection switch 18 is open or closed. A power supply holding transistor 23 is arranged to enable the transistor 9 to operate for a continued power supply from the battery 1 to the automatic focus detecting device A, the storage device B and the phototaking device C during a period of time while the high level signal is produced from the OR gate 22. A display LED 24 is arranged to serve as a display device for indicating that the focusing data is being retained at the storage device B.

Figure 2:
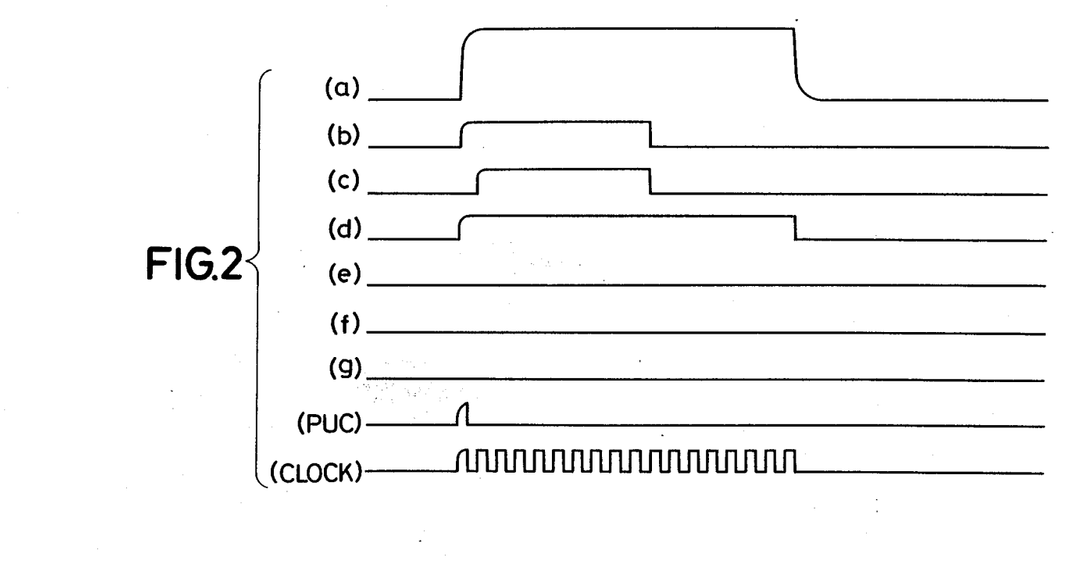
FIG. 2 is a time chart showing the operation of the circuit arrangement of FIG. 1 performed when only a prefocus switch is closed.
Figure 3:
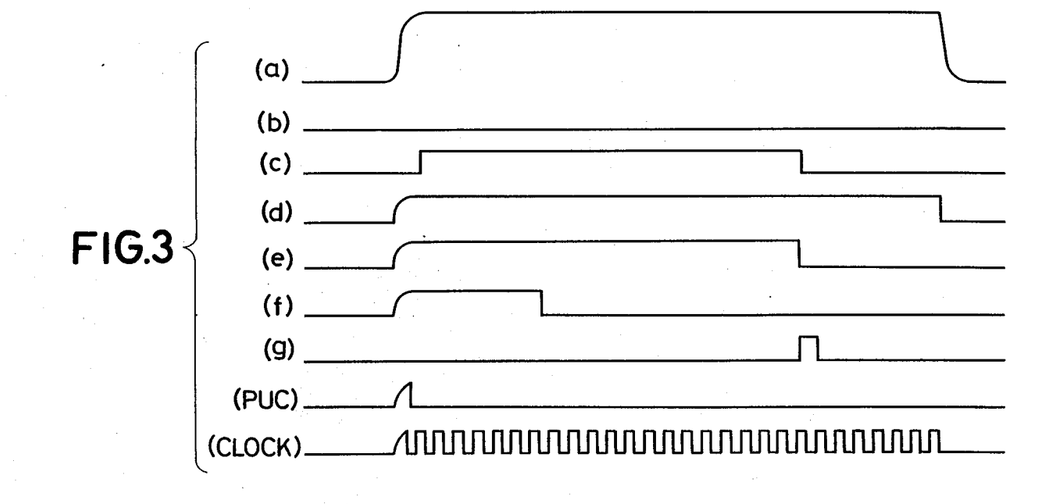
FIG. 3 is a time chart showing the operation of the circuit arrangement of FIG. 1 performed when only a release switch is closed.
Figure 4:
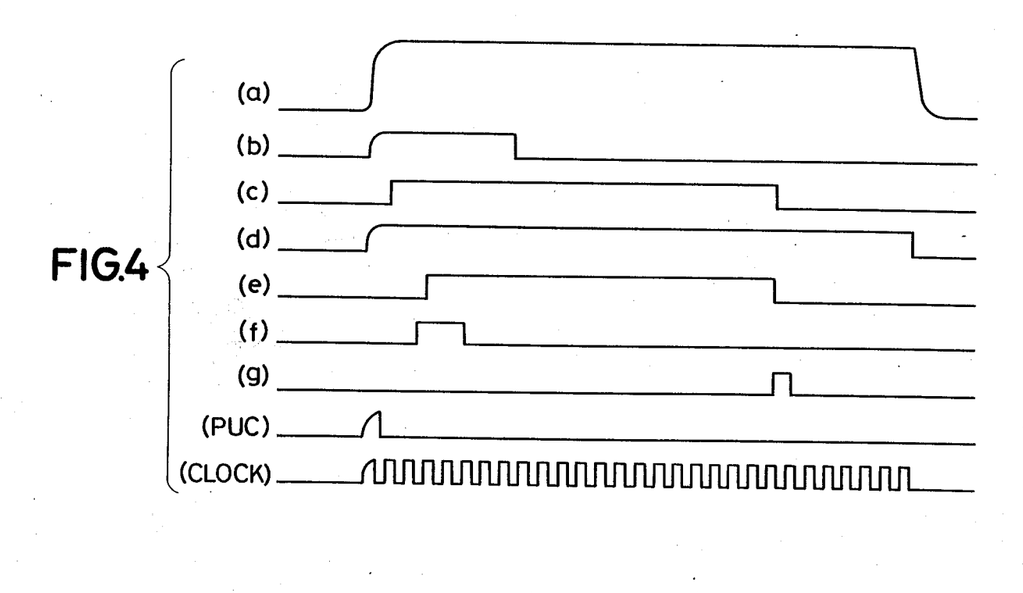
FIG. 4 is a time chart showing the operation of the circuit arrangement of FIG. 1 performed when the release switch is closed after the pre-focus switch is closed.

The circuit arrangement of the embodiment as shown in FIG. 1 operates as described below with reference to the time charts of FIGS. 2, 3 and 4:

First, referring to the time chart of FIG. 2, the embodiment is arranged to perform the so-called pre-focus operation in which detection of a focusing data is alone carried out without performing any exposure effecting operation. In that instance, an object to be photographed as viewed through the view finder is set within a distance measurement mark which is provided within the view finder of the camera though it is not shown. Following this, a pre-focus operation member which is not shown is operated to close the pre-focus switch 4. In association with this, the power supply switch 6 is closed to render the transistor 9 conductive. The power supply from the battery 1 then begins to be effected to the automatic focus detecting device A, the storage device B and the photo-taking device C respectively as indicated at a part (a) in FIG. 2. Meanwhile, the initial setting signal PUC is produced as indicated at a part (PUC) in FIG. 2 from the initial setting circuit which is not shown. Each circuit element is reset by the signal PUC. Upon receipt of the power supply from the battery 1, the automatic focus detecting device A detects either a data on the distance to the object located within the distance measurement mark not shown or other focusing data such as a defocus data, etc. The data thus detected is retained by the storage device B as long as the power supply continues from the battery 1. Concurrently with this, the display LED 24 lights up to show that the focusing data is being held at the storage device B. With the pre-focus switch 4 alone closed, the focusing data is merely kept at the storage device B and no exposure effecting operation is initiated by the phototaking device C. Therefore, under this condition, the object may be moved out of the distance measurement mark for composing a picture as desired. It is also possible, to again detect a focusing data every time the object moves or every time one object is replaced by another.

With the pre-focus switch 4 closed, a high level signal which is as shown at a part (b) of FIG. 2 is supplied from the inverter 11 to the D input terminal of the D type flip-flop 10. The D type flip-flop 10 then produces a high level signal from the Q output terminal thereof while the pre-focus switch 4 remains in its closed state. The level of the output of the OR gate 15 then also becomes high as shown at a part (c) of FIG. 2. The high level output of the OR gate 15 keeps the counter 16 in a reset state. Since the level of the Q output of the counter 16 is thus kept low, the level of the Q output of the J type flip-flop 17 also remains low. The low level Q output of the flip-flop 17 is inverted into a high level by the inverter 21. In the event that the selection switch 18 is open, the inverted output of the inverter 21 comes via the AND gate 20 and the OR gate 22 to cause a high level signal applied to the power supply holding transistor 23. This renders the transistor 23 operative. Following this, when the pre-focus switch 4 is opened with the pre-focus operation member which is not shown released from the operated state thereof, the high level output of the inverter 11 which is supplied to the D input terminal of the D type flip-flop 10 changes to a low level. The level of the Q output of the D type flip-flop 10 then also becomes low. The Q output of the J type flip-flop 12 is also supplied to the input terminal of the OR gate 15. However, since the release switch 2 is left open in this instance, the Q output of the J type flop-flop 12 remains at a low level as shown at a apart (e) of FIG. 2. Further the initial setting signal PUC is also at a low level. Therefore, the output level of the OR gate 15 becomes low to release the counter 16 from a reset state. The counter 16 begins to count. When a predetermined length of time is counted by the counter 16, a high level signal is produced from the Q output terminal of the counter 16. The high level Q output of the counter 16 changes the level of the Q output of the J type flip-flop 17 to a high level. The high level Q output of the flip-flop 17 is inverted by the inverter 21. As a result, the output level of the AND gate 20 becomes low. Since the Q output of the J type flip-flop 12 is at a low level, the output level of the OR gate 22 becomes low to bring the operation of the power supply holding transistor 23 to a stop. In other words, when the pre-focus operation member is released from an operation being performed thereon, the pre-focus switch 4 is opened and then the power supply switch 6 is also opened. However, before the lapse of the predetermined length of time which is counted by the counter 16 as mentioned above, the power supply holding transistor 23 operates to cause the power supply transistor 9 to keep on working even after the power supply switch 6 is opened. Therefore, the power supply is continuously effected to the automatic focus detecting device A and the storage device B, so that the focusing data can be still retained. Even if the power supply switch 6 happens to be opened by an operation performed by mistake on the prefocus operation member despite of the fact that the focusing data has already been obtained, the focusing data which is held at the storage device B can be saved from being cancelled by again closing the power supply switch 6 while the focusing data is retained over the predetermined period of time. This arrangement thus effectively prevents such troubles that: A focusing data obtained disappears when the pre-focus operation member is operated by mistake to accidentally open the power supply switch 6. Then, a blurred photograph is taken without knowing this accident. Even if the accident is noticed by the photographer, a desired shutter chance may be missed while the operation of detecting a focusing data is being performed over again from the beginning.

Further, in cases where the object moves or one object is replaced with another or the object distance changes after a focusing data has been detected, the retained focusing data can be immediately cancelled for renewal of the focusing data by closing the selection switch 18, because: With the selection switch 18 closed, the output level of the AND gate 20 becomes low to render the power supply holding transistor 23 inoperative and then, under this condition, the focusing data can be immediately released from the retained state by opening the power supply switch 6. Further, the above-stated predetermined period of time to be counted by the counter 16 is set at a value longer than a length of time required for completion of the operation of the automatic focus detecting device A. With the counting time set in this manner, the power supply to the automatic focus detecting device A continues at least until completion of detection of the focusing data even if the power supply switch 6 is opened immediately after it is closed. This arrangement thus ensures the accuracy of the focusing data.

Referring to the time chart of FIG. 3, in case that an exposure is to be made immediately after detection of a focusing data, the embodiment operates as follows: With the object to be photographed set to be at the distance measurement mark provided within the view finder of the camera, the release switch 2 is closed when the shutter release operation member which is not shown is operated. Then, the initial setting signal PUC is produced from the initial setting circuit which is not shown as shown at a part (PUC) in FIG. 3. This signal PUC resets each circuit element and at the same time closes the power supply switch 6. The power supply transistor 9 becomes operative. Then, as indicated at a part (a) in FIG. 3, power supply is effected to cause the automatic focus detecting device A to detect a focusing data, the storage device B to store and keep the focusing data thus obtained and the display LED 24 to light up to show that the focusing data is held at the storage device B. With the release switch 2 closed, a high level signal which is as shown at a part (f) in FIG. 3 is supplied from the inverter 13 to the J input terminal of the J type flip-flop 12. Upon receipt of the high level signal, the J type flip-flop 12 produces from its Q output terminal a high level signal as shown at a part (e) in FIG. 3 until a one-frame winding completion signal which is as shown at a part (g) in FIG. 3 comes from the photo-taking device C via the OR gate 14. The high level signal from the flip-flop 12 keeps the power supply transistor 9 operating. This arrangement ensures that the power supply is continuously effected without interruption to the focus detecting device A, the storage device B and the photo-taking device C until completion of a photographing operation. With the high level signal produced from the Q output termrnal of the J type flip-flop 12, the photo-taking device C receives this signal. Then, after the focusing data comes to be retained at the storage device B, the device C shifts the photo-taking lens which is not shown to an in-focus position thereof on the basis of this focusing data. Following that, the device C opens shutter blades to have the film exposed to light. After an apposite degree of exposure is attained, the shutter blades are closed to bring the exposure to an end. Upon completion of the exposure, one frame portion of film is automatically wound up by means of a motor. Upon completion of the process of winding the one-frame portion of film, a one-frame winding completion signal which is as shown at a part (g) in FIG. 3 is produced from the device C and is supplied via the OR gate 14 to the J type flip-flop 12 to reset it and thus to bring the photographing operation to an end. The arrangement of the photo-taking device C is well known. Therefore, the details of it are omitted from the description given here. When the J type flip-flop 12 is reset by the one-frame winding completion signal, the level of the Q output of the flip-flop becomes low. If the pre-focus switch 4 is open, therefore, the Q output of the D type flip-flop 10 is also at a low level and the initial setting signal PUC is also at a low level. As a result, the output level of the OR gate 15 becomes low as shown at a part (c) in FIG. 3. The counter 16 is released from its reset state. Then, in the same manner as in the case where the pre-focus switch 4 is operated as mentioned in the foregoing, if the selection switch 23 is open, a high level signal which is as shown at a part (d) in FIG. 3 is produced from the OR gate 22 until the predetermined length of time is counted by the counter 16. The high level signal from the OR gate 22 actuates the power supply holding transistor 23 to have the focusing data kept at the storage device B. Therefore, even after completion of a photographing operation, if the release switch 2 is again closed before the end of counting of the predetermined length of time by the counter 16, another photographing operation can be performed again on the basis of the same focusing data kept at the storage device B. This feature is highly advantageous for consecutive photographing operations, because: In such a case, an additional length of time otherwise would be required for obtaining a focusing data once again becomes unnecessary. Further, in the event of consecutive photographing operations to be performed by renewing the focusing data upon completion of every photographing operation and before another, photographing can be accomplished in that mode by closing the selection switch 18. In that event, with the selection switch 18 closed, the AND gate 20 no longer produces any high level signal to bring one photographing operation to an end. Then, the one-frame winding completion signal is supplied to the J type flip-flop 12 to make the level of the Q output of the flip-flop 12 low. The output level of the OR gate 22 then also immediately becomes low to bring the operation of the power supply holding transistor 23 to a stop. As a result, the focusing data kept at the storage device B is cancelled. Then, following this, a next photographing operation can be accomplished by again closing the release switch 2 to detect a new focusing data. In this manner, the focusing data can be renewed every time one photographrng operation is performed. Further, after completion of the photographing operation, if the release switch 2 is left in the closed state when the one-frame winding completion signal is produced from the photo-taking device C, the J type flip-flop 12 is momentarily reset and the level of its Q output becomes a low level. However, since a high level signal is applied from the inverter 13 to the J input terminal of the J type flip-flop 12, the level of the Q output thereof again becomes high. This Q output comes via the OR gate 22 to cause the power supply holding transistor 23 to continuously operate. Therefore, the focusing data stored at the storage device B is allowed to be further retained there. Then, a next photographing operation is accomplished on the basis of the focusing data retained irrespectively of the position of the selection switch 18. In this instance, the release switch 2 is closed when the J type flip-flop 12 is reset by the above-stated one-frame winding completion signal. Therefore, the power supply switch 6 which is in association with the release switch 2 is also closed to have power supply continuously effected to the storage device B. This arrangement thus ensures that the focusing data never be cancelled due to the resetting of the J type flip-flop 12.

Next, in case that a focusing data is first detected beforehand and then a picture is composed before effecting an exposure, the embodiment operates as follows: A main object to be photographed is first set at the distance measurement mark of the view finder which is not shown. The pre-focus switch 4 is then closed. With the switch 4 closed, a focusing data is held at the storage device B in the same manner as described in the foregoing. Following that, with the pre-focus switch 4 left in the closed state, the main object is moved out of the distance measurement mark to obtain a desired picture composition. With the picture thus having been composed, the release switch 2 is closed. Then, since the focusing data is held at the storage device C, the photo-taking device C begins to perform a photographing operation on the basis of the focusing data. In this instance, since the focusing data kept at the storage device B still remains unchanged after it is obtained when the pre-focus switch 4 is closed, the main object never comes out of focus wherever it may be located within the field of the view finder. Further, in this instance, even if the pre-focus switch 4 is opened by mistake after the main object is moved out of the distance measurement mark in composing a picture following detection of the focusing data, the focusing data can be used as it is either by closing the pre-focus switch 4 again or by closing the release switch 2 within the above-stated predetermined period as long as the selection switch 18 is left open, because, as mentioned above, the focusing data is retained at the storage device B over the predetermined period of time. The result of photographing, therefore, can be prevented from blurring. FIG. 4 shows this operation in a timing chart.

In the circuit arrangement shown in FIG. 1, the release switch 2 and the pre-focus switch 4 are arranged to be operated separately from each other. However, this arrangement of course may be replaced with another arrangement in which the pre-focus switch 4 is arranged to be closed by the first stroke of an operation performed on a shutter release button and the release switch 2 to be closed by the second stroke thereof. The signal which is indicative of completion of a photographing operation and is to be supplied to the OR gate 14 does not have to be the one-frame winding completion signal as in the case of the example described but may be any other signal that is indicative of completion of a photographing operation. The counter 16 may be provided with some switch that that is arranged to permit adjustment of the length of time to be counted by the counter 16 as necessary.

Figure 5:
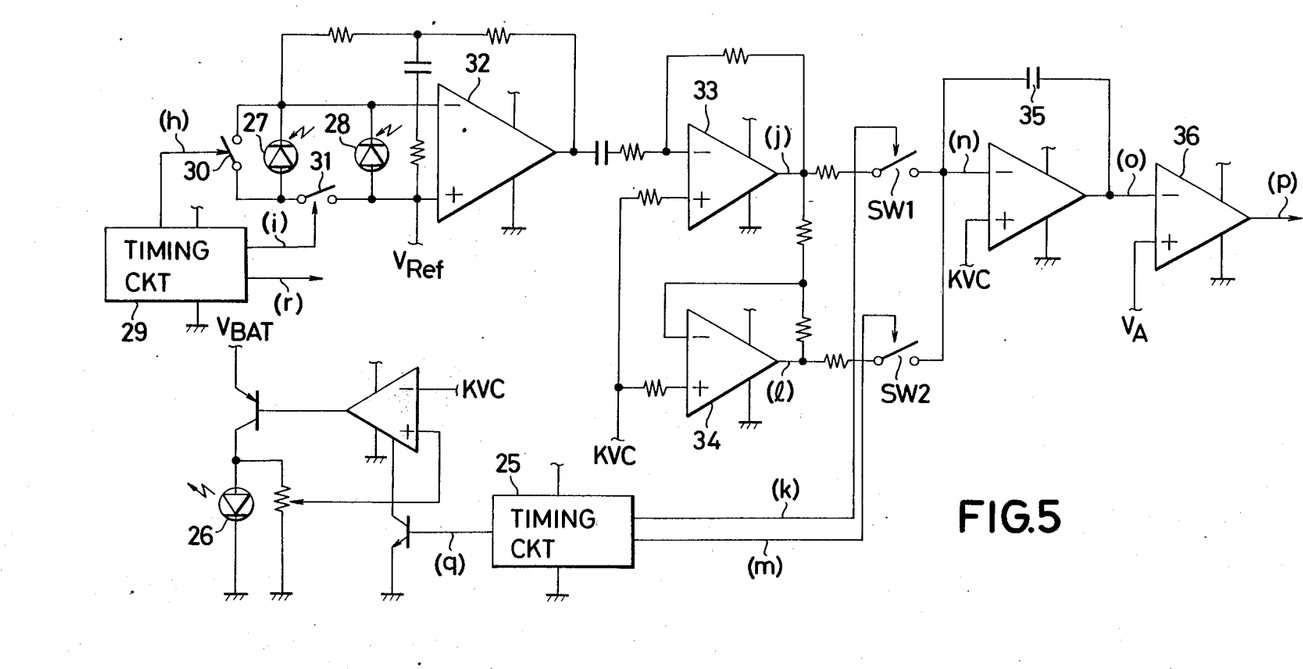
FIG. 5 is a circuit diagram showing by way of example the details of arrangement of an automatic focus detecting device shown on FIG. 1.
Figure 6:
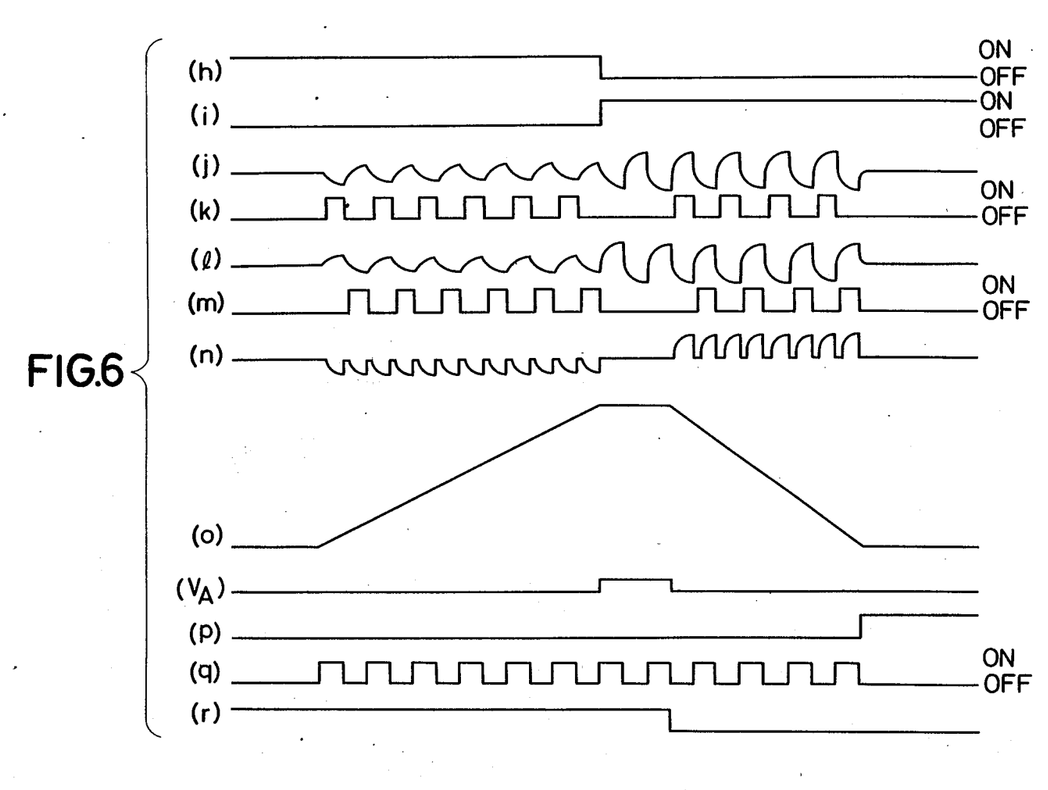
FIG. 6 is a time chart showing the operation of the circuit arrangement of FIG. 5.

FIG. 5 shows an example of the details of the automatic focus detecting device A shown in FIG. 1. FIG. 6 shows the operation of the device A in a timing chart. In the arrangement of FIG. 1, when the release switch 2 or the pre-focus switch 4 is closed, the power supply switch 6 is closed in response thereto. With the switch 6 closed, a power supply begins to be effected from the battery 1 to the automatic focus detecting device A. Then, at the device A as shown in FIG. 5, a timing circuit 25 begins to operate. The timing circuit 25 then produces a signal which is as shown at a part (q) in FIG. 6. This signal causes a light projecting element 26 which is an LED or the like to project a signal light onto an object to be photographed. The signal light projected is then reflected by the object. The signal light thus reflected by the object is then received according to the principle of triangulation in a ratio according to the object distance by two photo-sensitive or light receiving elements 27 and 28 which are arranged in parallel in the direction of base length of the light projecting element 26. Another timing circuit 29 is arranged to produce signals as shown at parts (h) and (i) of FIG. 6. By these signals (h) and (i), a switch 30 is turned on and another switch 31 turned off beforehand. Under this condition, the output of the photo-sensitive element 28 is alone amplified by an amplifier 32. An amplified signal thus obtained is again amplified by another amplifier 33. As a result, the amplifier 33 produces a signal which is as shown at a part (j) in FIG. 6. The signal (j) produced from the amplifier 33 is inverted by an inverter 34 to become a signal as shown at a part (1) in FIG. 6. These signals (j) and (1) are applied to switches SW1 and SW2 which are operated by signals (k) and (m) produced from the timing circuit 25. By the operation of these switches SW1 and SW2, a signal which is as shown at a part (n) of FIG. 6 is obtained. This signal (n) is Miller integrated by a capacitor 35. The Miller integration is performed for a predetermined period of time. After completion of this integration process, the switch 30 turns off and the other switch 31 turns on when a reverse charge start signal (r) which is as shown at a part (r) in FIG. 6 is produced from the timing circuit 29. Then, this time, the sum of the outputs of both the photo-sensitive elements 27 and 28 is amplified by the amplifier 32. Signals (j) and (1) which are amplified and inverted in the same manner as described above are applied to the switches SW1 and SW2 which are this time operated by the timing circuit 25 at a timing differing 180 degrees from the previous timing. A signal (n) thus obtained this time is inverted from the previous signal (n). The capacitor 35 is then reversely charged with this signal to obtain a signal (o) as shown at a part (o) in FIG. 6. A comparator 36 compares this signal (o) with a reference voltage VA. As a result of this comparison, a signal (p) which is as shown at a part (p) in FIG. 6 is obtained from the comparator 36. A focusing condition can be detected by counting a length of time required before the level of this output of the comparator 36 becomes high, because: According to the principle of triangulation, the ratio in which the reflected signal light is received by the photo-sensitive elements 27 and 28 parallel arranged in the base length direction of the light projecting element varies with the distance to the object. Therefore, the object distance is detectable by the ratio of the output of the photosensitive element 28 to the sum of the outputs of the photosensitive elements 27 and 28. In the case of this circuit, the capacitor 35 accumulates a voltage corresponding to the quantity of light received by the photo-sensitive element 28; and reverse charging is effected with a voltage corresponding to the quantity of light received by both the photo-sensitive elements 27 and 28. Therefore, the distance to the object can be found by counting a length of time required for the reverse or counter-charging process.

Figure 7:
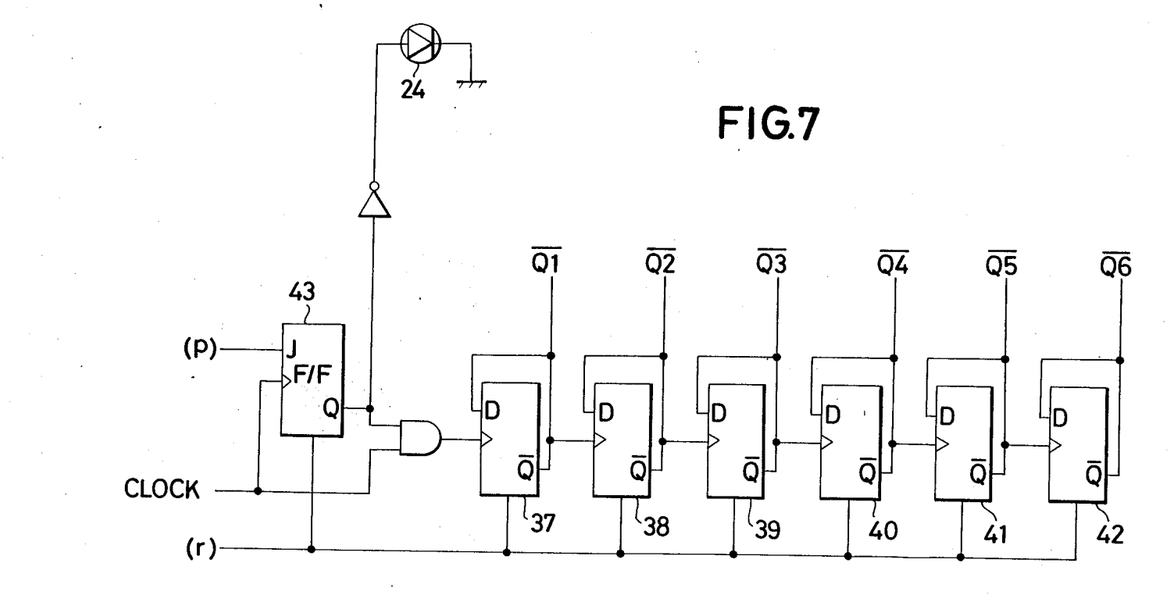
FIG. 7 is a circuit diagram showing by way of example the details of arrangement of a storage device which is included in the embodiment shown in FIG. 1.

FIG. 7 shows by way of example the details of arrangement of the storage device B which is shown in FIG. 1. When a reverse charge start signal (r) is produced from the timing circuit 29 of FIG. 5, counters 37 to 42 which are arranged as shown in FIG. 7 are released from their reset state by that signal. Then they perform counting operations until the output (p) of the comparator 36 of FIG. 6 becomes a high level. When the level of the output (p) of the comparator 36 becomes high, the high level signal (p) causes the level of the $\bar{Q}$ output of a J type flip-flop 43 to become low to have the counted values of the counters 37 to 42 latched thereby. By this, a data on the object distance which is time converted as mentioned above is held as a focusing data. Further, with the level of the $\bar{Q}$ output of the J type flip-flop 43 having become low, the display LED 24 which is shown in FIG. 1 comes to light up.

With the circuit arranged as shown in FIGS. 5 and 7, the focusing data can be retained as long as a current is supplied from the battery 1.

In accordance with this invention, the arrangement of the automatic focus detecting device A and that of the storage device B are not limited to those shown in FIGS. 5 and 7. These circuit arrangements of course may be replaced with any other circuit arrangements so long as these devices are arranged to begin to detect a focusing data the instant a current is supplied thereto from the battery 1 and to retain the detected focusing data as long as the current supply continues.

Figure 8:
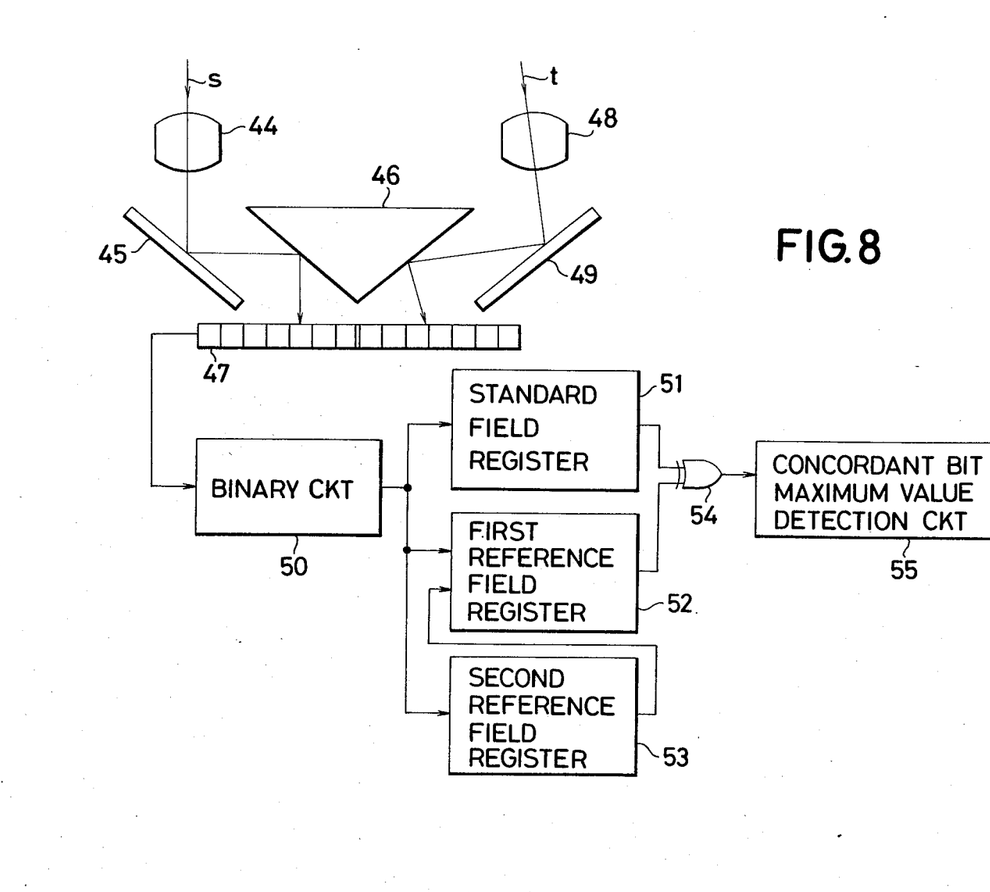
FIG. 8 is an illustration schematically showing another example of arrangement of the automatic focus detecting device of the embodiment shown in FIG. 1.

FIG. 8 shows another example of the arrangement of the automatic focus detecting device which meets the above-stated conditions. Referring to FIG. 8, an image bearing light flux from an object to be photographed is imaged in two different parts. In one part, the light flux is imaged on the standard field of an image sensor 47 through an optical path "s" formed by a standard optical system which consrs of a lens 44 and mirrors 45 and 46. In the other, the light flux is imaged on the reference field of the image sensor 47 through another optical path "t" formed by a reference optrcal system which consists of a lens 48 and mirrors 49 and 46. Then, the distribution of the light quantity over the surface of this light receiving element is read out bit by bit, or one bit at a time. Each of the outputs of the light receiving element which is thus obtained is converted into a digital signal by a binary circuit 50 at a certain threshold level corresponding to the quantity of light. A data which is thus obtained on the standard field side is stored at a standard field register 51. A data which is obtained on the reference field side is stored at reference field registers 52 and 53. An exclusive OR of the data of the standard field register 51 and the data of the reference field registers 52 and 53 is obtained at an exclusive OR gate 54. It is examined by this process to find whether the light quantity distributions on both sides coincide with each other. Next, one bit of the data of the reference field register 53 is shifted to the data of the reference field register 52 and again the same examination is performed to find whether the light quantity distributions coincide with each other. This process is repeated by shifting all the bits of the data of the reference field register 52 one after another. Then, a point where the number of concordant bits becomes a maximum value is detected by a detection circuit 55. Information on the object distance is thus obtained as a focusing data from the point at which the number of concordant bits becomes a maximum value.

As regards the arrangement to hold or retain the focusing data thus obtained, not only the method which is described in the foregoing but also a mechanical storing method of fixing the photo-taking lens in an in-focus position may be employed.

Figure 9:
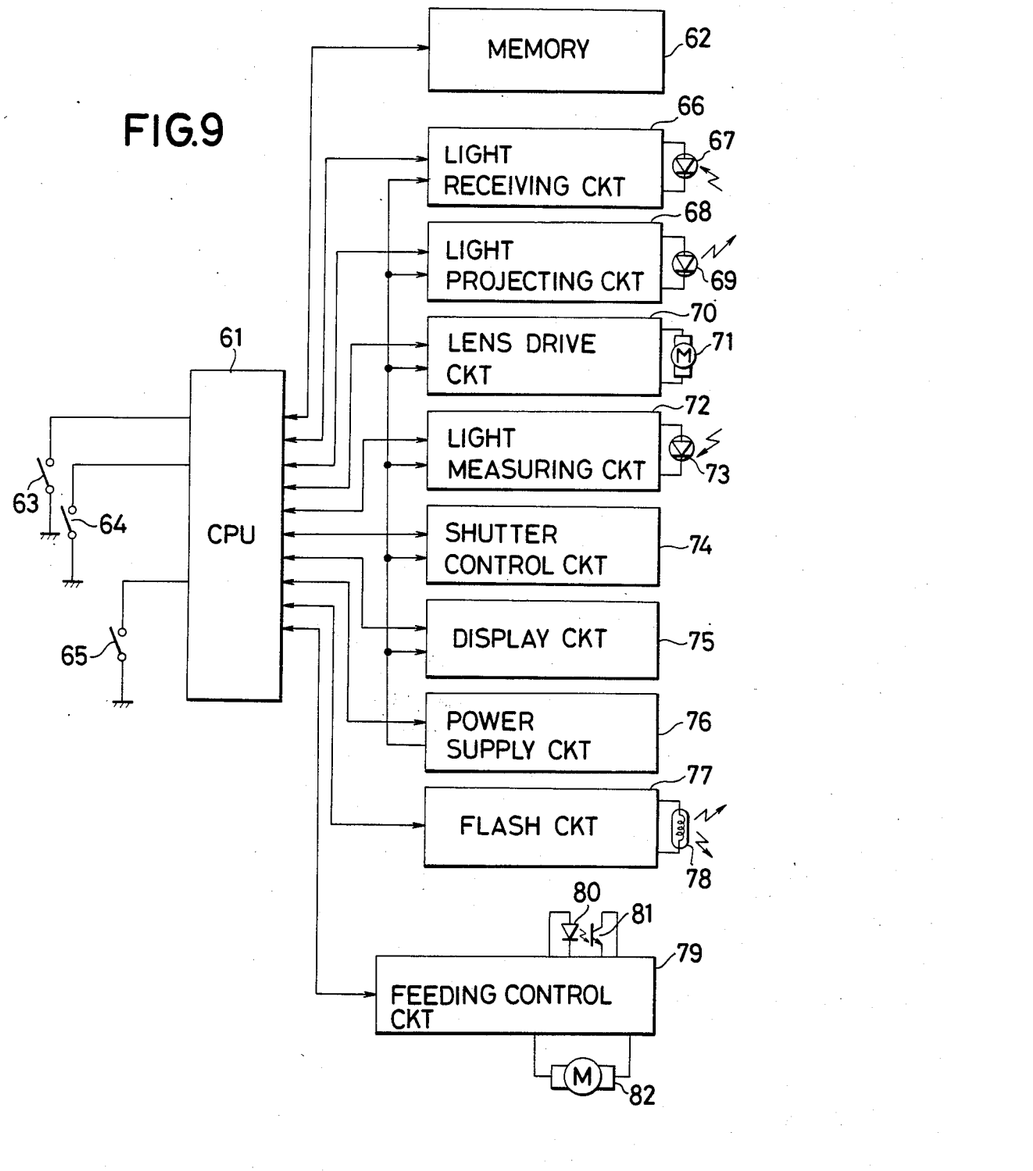
FIG. 9 is a diagram showing another embodiment of this invention in which the same operation as that of the circuit arrangement shown in FIG. 1 is arranged to be accomplished by means of a micro-computer.

FIG. 9 shows another embodiment of this invention wherein the same operation as that of the arrangement shown in FIG. 1 is arranged to be accomplished by means of a microcomputer. Referring to FIG. 9, the embodiment is provided with a central processing unit (hereinafter will be called CPU for short) 61 which serves as a central control circuit of the embodiment; a memory 62 which is arranged to store a program for operating the CPU 61 and the focusing data; a pre-focus switch 63 which is arranged to be used for detecting information required for focus adjustment such as a measured distance data, defocus data, etc. without performing any exposure effecting operation; a release switch 64 which is arranged to be used for performing an exposure immediately after detection of a focusing data; and a selection switch 65 which is arranged to be used for selecting or not selecting a process of storing and holding a focus detection data for a predetermined length of time after the pre-focus switch 63 or the release switch 64 is released from its operated position. A light receiving circuit 66 is arranged to receive by means of a distance measuring photosensitive element 67 a signal light projected from a light projecting element 69 of a light projecting circuit 68 and to perform a distance measuring operation in a know manner according to the principle of triangulation. A lens drive circuit 70 is arranged to drive a motor 71 to shift a photo-taking lens to an in-focus position in accordance with a decision made by the CPU 61 on the basis of a focusing data obtained from the light receiving circuit 66. A light measuring circuit 72 is arranged to measure the luminance of an object to be photographed and is provided with a light measuring photo-sensitive element 73 for that purpose. A shutter control circuit 74 is arranged to perform an automatic exposure control operation on a shutter on the basis of the output of the light measuring circuit 72. A display circuit 75 is arranged to make a display showing whether a focusing data is being retained. A power supply circuit 76 is arranged to effect a power supply to each of the above-stated circuits 66 to 75 in response to an instruction received from the CPU 61. The CPU 61 and the memory 62 are constantly receiving a power supply and remain in a operative state. A flash circuit 77 is arranged to emit a flash light by means of a xenon lamp 78 for flash photography. A feeding control circuit 79 is arranged to control a motor 82 by detecting the perforation of a film in use by means of a photo-coupler (80 and 81). The motor 82 is thus arranged to wind up one frame portion of the film. The details of arrangement of these circuits are well known and require no further description here.

Figures 10, 10A:
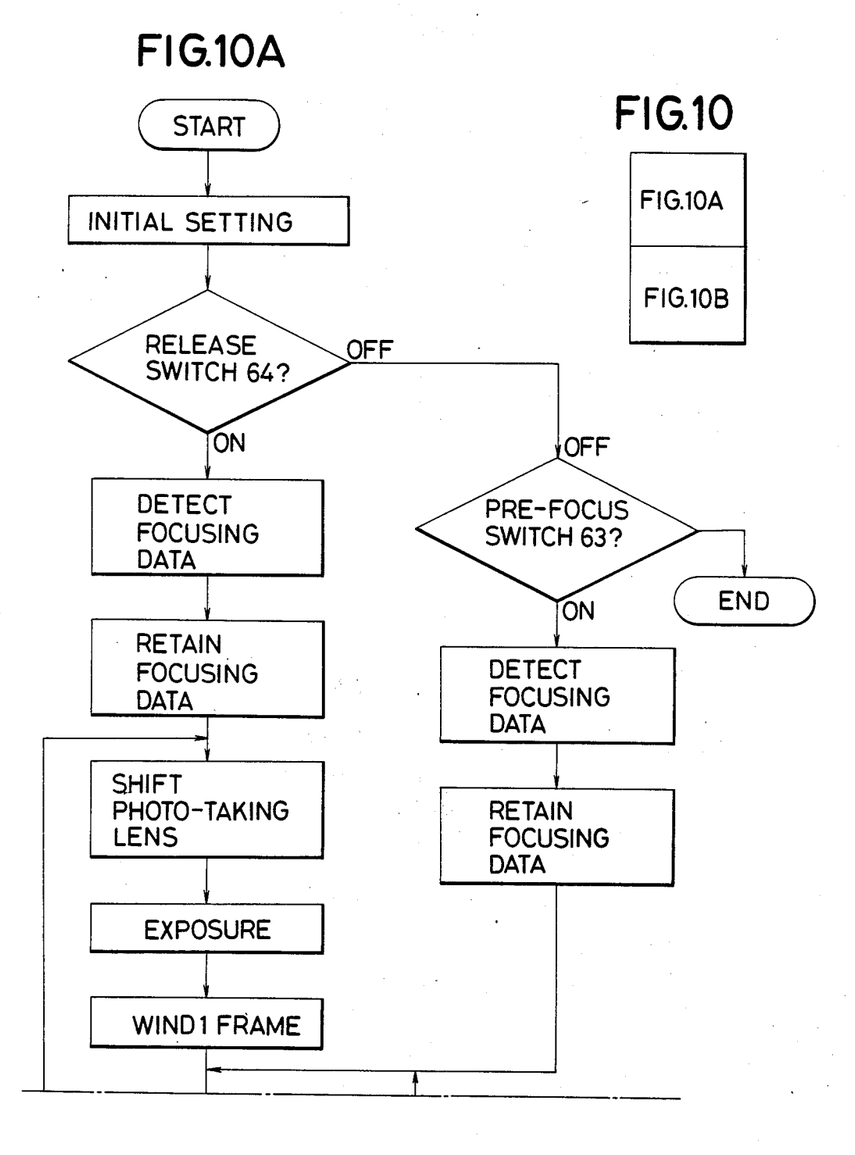
FIG. 10 is a flow chart showing the operation of the arrangement of FIG. 9.
Figure 10B:
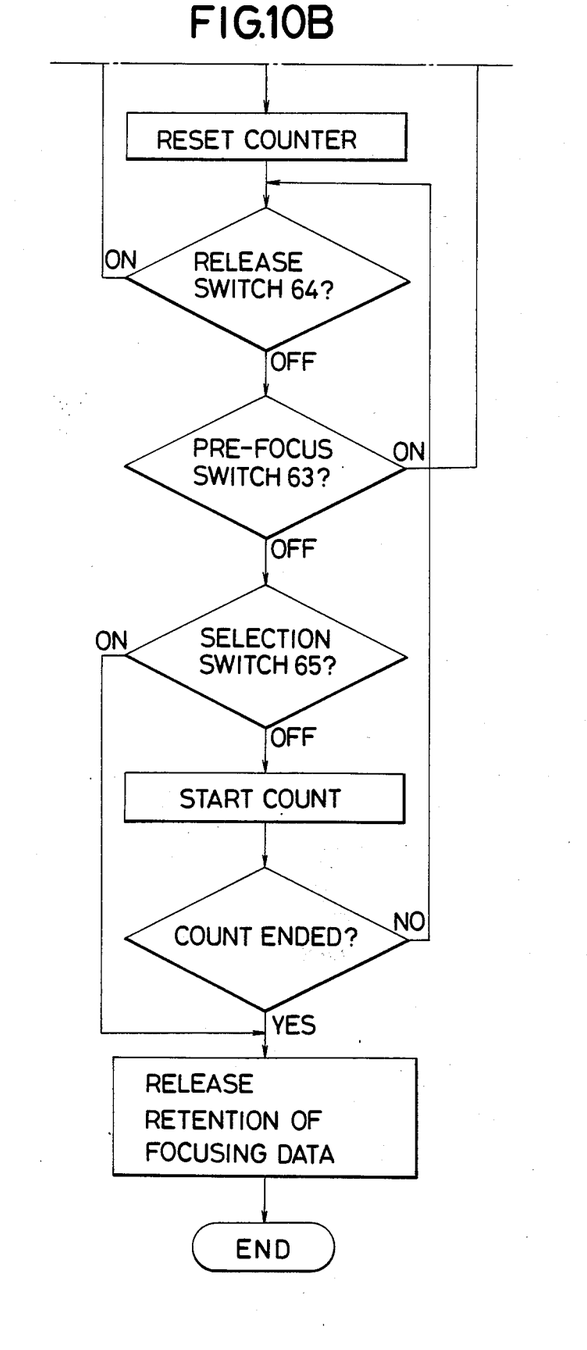

The operation of the embodiment shown in FIG. 9 is performed as shown in FIG. 10 in a flow chart. When either the pre-focus switch 63 or the release switch 64 is closed, the CPU 61 shifts from a stand-by mode to an operating mode. The CPU 61 then supplies an instruction to the power supply circuit 76 to make a power supply to each of the circuits 66 to 75. At the same time, the CPU 61 resets its internal counter arrangement and performs an initial setting operation on eacn of the peripheral circuits. Next, the CPU 61 judges which is operated, the release switch 64 or the pre-focus switch 63?. If the release switch 64 is judged to have been operated, a focusing data is detected by the light projecting circuit 68 and the light receiving circuit 66. The detected focusing data is kept at the memory 62. Following this, the lens drive circuit 70 shifts the photo-taking lens to an in-focus position thereof according to the focusing data. Then, an automatic exposure control operation is performed by the shutter control circuit 74. The film is then exposed to light. The feeding control circuit 79 performs film winding to wind one frame portion of the film. A photographing operation then comes to an end. After completion of a cycle of processes of the photographing operation, if the release switch 64 is left in its closed position, another cycle of photographing processes is once again performed on the basis of the above-stated focusing data stored at the memory 62. In case that the release switch 64 is turned off or opened while the pre-focus switch is on after completion of the photographing operation, the focusing data stored at the memory 62 remains unchanged as long as the pre-focus switch 63 is on (or closed). During that period, if the release switch 64 is again closed, another cycle of photographing operation is performed on the basis of the focusing data. In the event that both the release switch 64 and the pre-focus switch 63 are off after completion of photographing, the position of the selection switch 65 is checked. If the switch 65 is found on, the focusing data stored at the memory 62 is cancelled and the embodiment or CPU 61 comes back to a stand-by mode. If the selection switch 65 is then found off, the counter incorporated in the CPU 61 begins a counting process and the cancellation of the focusing data retained at the memory 62 is inhibited until the lapse of a predetermined period of time even if both the release switch 64 and the pre-focus switch 63 are off after completion of photographing. During this inhibited period, if either the release switch 64 or the pre-focus switch 63 is again closed, the operation of the embodiment is performed in the same manner as in the case where the release switch 64 or the pre-focus switch 63 is closed after completion of photographing. In this instance, with the release switch 64 or the pre-focus switch 63 closed, the counter which has begun to count within the CPU 61 is reset. After that, when the release switch 64 or the pre-focus switch 63 is opened, the counter of the CPU 61 again begins to count from the beginning.

On the other hand, if the initial switching operation is performed on the pre-focus switch 63 instead of the release switch, the embodiment operates as follows: A focusing data is detected by the light projecting and receiving circuits 68 and 66. The detected focusing data is held at the memory 62. After that, the operation proceeds to the process to be performed after completion of photographing as described in the foregoing.

A camera arranged according to this invention as described in the foregoing comprises the automatic focus detecting device which is arranged to form a focusing data required for adjustment of a photo-taking optical system to an in-focus state; the switching means for operating the automatic focus detecting device; and the storage device which is arranged to store and retain the focusing data for a predetermined period of time even when the switching means is turned off before commencement of an exposure. It is an advantage of the embodiment that: With a focusing data obtained and retained by the first stroke of an operation on the shutter button after locating an object to be photographed at the distance measurement mark of the view finder, the focusing data can be kept in that retained state over a predetermined period of time without being cancelled even if the shutter button is allowed by mistake to come back to its initial position during the process of composing a picture by varying the location of the object within the view finder. The object, therefore, can be kept in focus without blurring it. In addition to that, the photographer can be saved from missing a shutter chance while trying to have a focusing data newly detected.

Further, another camera arranged according to this invention to have the automatic focus detecting device which forms a focusing data for adjustment of a photo-taking optical system to an in-focus position, the switch means for operating the automatic focus detecting device and the storage device which is arranged to store and retain the focusing data for a predetermined period of time after completion of an exposure even when the switch means is turned off has the following advantage: The arrangement to hold the focusing data for a predetermined period of time after completion of an exposure even with the switch means turned off enables consecutive photographing operations to be carried out without resulting in blurred pictures even if the object to be photographed moves within the picture plane.

In either cases of the above-stated two embodiments, the focusing data is arranged to be retained for a fixed length of time. This arrangement obviates the necessity of arranging an additional switch for the retention of the focusing data, so that the structural arrangement of the camera can be simplified to lessen the possibility of erroneous operations and degraded operability. Further the above-stated arrangement to terminate the retention of the focusing data after the lapse of the predetermined period of time ensures adequate operability and effectively prevents an erroneous operation of the camera which otherwise tends to result from a failure, by an oversight, to cancel the retention of the focusing data. Therefore, this invention gives great advantages.

What is claimed is:

1. A camera comprising:
   (a) automatic focus detecting means for forming a focusing data to be used for adjustment of a photo-taking optical system to an in-focus state;
   (b) switch means for causing said automatic focus detecting means to operate; and
   (c) storing means for holding said focusing data for a predetermined period of time after said switch means is turned off.

2. A camera according to claim 1, wherein said storing means includes timer means which is arranges to begin to count said predetermined period of time in response to said turning off of the switch means.

3. A camera according to claim 2, further comprising inhibiting means for inhibiting the operation of said timer means.

4. A camera according to claim 1, wherein said storing means includes informing means for informing the operator of the camera that a focusing data is being retained.

5. A camera comprising:
   (a) automatic focus detecting means for forming a focusing data to be used for adjustment of a photo-taking optical system to an in-focus state;
   (b) switch means for causing said automatic focus detecting means to operate; and
   (c) storing means for holding said focusing data over a predetermined period of time after completion of an exposure even with said switch means having been turned off.

6. A camera according to claim 5, wherein said storing means includes timer means which is arranged to begin to count said predetermined period of time in response to completion of said exposure.

7. A camera according to claim 6, further comprising inhibiting means for inhibiting the operation of said timer means.

8. A camera according to claim 5, wherein said storing means includes informing means for informing the operator of the camera that a focusing data is being retained.

* * * * *